United States Patent

Assaad et al.

[11] Patent Number: 5,858,137
[45] Date of Patent: Jan. 12, 1999

[54] RADIAL TIRES HAVING AT LEAST TWO BELT PLIES REINFORCED WITH STEEL MONOFILAMENTS

[75] Inventors: Mahmoud Cherif Assaad, Uniontown; Dong Kwang Kim, Akron, both of Ohio

[73] Assignee: The Goodyear Tire & Rubber Company, Akron, Ohio

[21] Appl. No.: 611,391

[22] Filed: Mar. 6, 1996

[51] Int. Cl.$^6$ ............................... B60C 9/18; B60C 9/20
[52] U.S. Cl. .................. 152/527; 152/451; 152/526; 152/532
[58] Field of Search ................... 152/527, 532, 152/526, 451; 57/902

[56] References Cited

U.S. PATENT DOCUMENTS

| | | | |
|---|---|---|---|
| 2,786,507 | 3/1957 | Howe et al. .......................... | 152/532 |
| 3,081,811 | 3/1963 | Beckadolph et al. ............... | 152/532 X |
| 3,802,982 | 4/1974 | Alderfer ............................... | 152/527 X |
| 4,215,736 | 8/1980 | Herbellean .......................... | 152/532 X |
| 4,371,025 | 2/1983 | Canevari et al. . | |
| 4,546,031 | 10/1985 | Richards ............................. | 57/902 X |
| 4,738,096 | 4/1988 | Hatakeyama et al. .............. | 152/527 X |
| 4,819,705 | 4/1989 | Caretta ................................ | 152/527 |
| 5,295,346 | 3/1994 | Bundo et al. ....................... | 152/527 X |
| 5,332,017 | 7/1994 | Imamiya et al. .................... | 152/527 |
| 5,368,081 | 11/1994 | Imamiya et al. .................... | 152/527 X |
| 5,386,860 | 2/1995 | Massie II et al. ................... | 152/527 X |
| 5,411,071 | 5/1995 | Chapelle ............................. | 152/527 |
| 5,490,550 | 2/1996 | Massie II, et al. ................. | 152/527 X |
| 5,524,687 | 6/1996 | Poqué et al. ........................ | 152/527 |
| 5,616,197 | 4/1997 | Heifer et al. ....................... | 152/527 |

FOREIGN PATENT DOCUMENTS

| | | | |
|---|---|---|---|
| 0414892 | 3/1991 | European Pat. Off. ............ | 152/532 |
| 0679543 | 11/1995 | European Pat. Off. . | |

*Primary Examiner*—Adrienne Johnstone
*Attorney, Agent, or Firm*—Bruce J. Hendricks

[57] ABSTRACT

A pneumatic radial tire includes at least two belt plies reinforced with steel monofilaments inclined at an angle of 10° to 30° with respect to the equatorial plane of the tire, the monofilaments being laid at an end count ranging from 25 to 60 ends per inch and having a diameter of from 0.25 to 0.40 mm, a tensile strength of at least 4080 MPa–(2000×D)×95 percent where D is the filament diameter in millimeters and a fatigue resistance of at least 3500 cycles as measured by the three-roll bending fatigue test. Preferably, the filament diameter ranges from 0.30 to 0.35 mm, the tensile strength of each monofilament is at least 4400 MPa–(2000×D)×95 percent and the fatigue resistance ranges from 3500 to 6000 cycles.

12 Claims, 1 Drawing Sheet

RADIAL TIRES HAVING AT LEAST TWO BELT PLIES REINFORCED WITH STEEL MONOFILAMENTS

TECHNICAL FIELD

The present invention relates to a radial tire containing steel monofilaments in at least two belt plies of the tire.

BACKGROUND OF THE INVENTION

U.S. Pat. No. 4,371,025 discloses a radial tire having an annular reinforcing structure comprising at least two layers of steel monofilaments arranged on a carcass having a radius of curvature, on the meridian plane in the crown point, equal to or greater than 400 mm. The monofilaments preferably have a specific tensile strength of at least 2000 N/mm$^2$, a modulus of elasticity of 205,000 N/mm$^2$, an elongation of 1.4 percent for a stress equal to 100 percent of the tensile strength. This patent does not address the fatigue properties of the monofilament. Whereas tires have been manufactured with belt plies incorporating steel monofilaments exceeding the values listed in this patent, those tires using steel monofilaments falling below the required fatigue properties described herein miserably failed practical testing conditions.

SUMMARY OF THE INVENTION

The present invention relates to a pneumatic radial tire having at least two belt plies each of which comprises a layer of substantially straight steel monofilaments. The advantages of the present invention include a tire which not only maintains excellent handling characteristics but does so without the unacceptable wire breakage in the belt plies. The steel monofilaments are laid at an end count ranging from 25 to 60 ends per inch and each monofilament has a diameter of from 0.25 to 0.40 mm; a tensile strength of at least 4080 MPa–(2000)×D×95 percent, where D is the filament diameter in millimeters; and a fatigue of at least 3500 cycles as measured by the three-roll bending fatigue test.

DETAILED DESCRIPTION OF THE INVENTION

Figure 1:
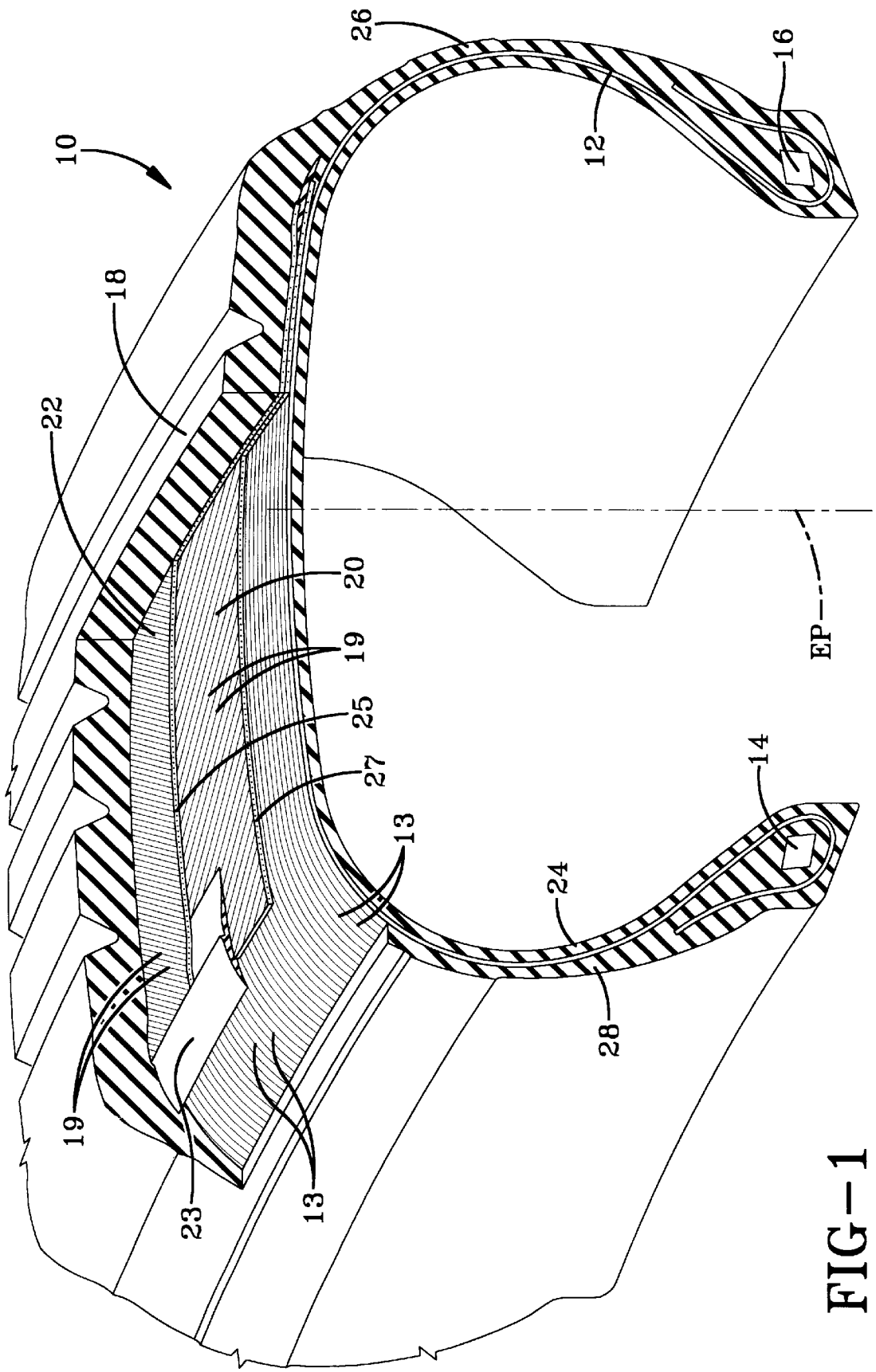
FIG. 1 shows a pneumatic tire in partial sectional view.

As used herein and in the claims:

"Axial" and "axially" are used herein to refer to lines or directions that are parallel to the axis of rotation of the tire.

"Bead" means that part of the tire comprising an annular tensile member wrapped by ply cords and shaped, with our without other reinforcement elements such as flippers, chippers, apexes, toe guards and chafers, to fit the design of the tire rim.

"Belt structure" means at least two rubber reinforced annular layers of plies of parallel monofilaments, underlying the tread, unanchored to the bead, and having both left and right cord angles in the range from about 10 to about 30 degrees with respect to the equatorial plane (EP) of the tire.

"Carcass" means the tire structure apart from the belt structure, the tread and the undertread, but including the beads. The carcass ply includes reinforcing cords embedded in an elastomeric substance and that these components are considered to be a single entity. The "main portion of the carcass ply" means the portion of the carcass ply which extends between the bead cores.

"Cord" means one or more of the reinforcement elements, formed by one or more filaments/wires which may or may not be twisted or otherwise formed and which may further include strands that may or may not be also so formed.

"Crown" means that portion of the tire within the width limits of the tire tread.

"Equatorial plane (EP)" means the plane perpendicular to the tire's axis of rotation and passing through the center of the tire's tread.

"Fatigue Resistance" is determined by a three-roll fatigue tester and method described in A Prakash et al, Fatigue Behavior of Wire and Cable, American Society for Metals, pages 405–408 (1985). The procedure is modified to accommodate a monofilament by placing the monofilament in a Tygon® plastic tube instead of being encapsulated in rubber. The diameter of the roller is one inch (2.54 cm) with a tension of 10 percent of the breaking strength of the monofilament.

"Load Range" means load and inflation limits for a given tire used in a specific type of service as defined by tables in *The Tire and Rim Association. Inc.* 1995 Year Book.

"Ply" means a continuous layer of rubber-coated parallel filaments.

"Pneumatic tire" means a laminated mechanical device of generally toroidal shape (usually an open-torous) having beads, a carcass ply and a tread.

"Simulated Gravel Wheel Test" means a laboratory test in which the endurance of a belt package of a tire is evaluated. The tire is inflated to 26 psi and tested at 100° F. (38° C.). The tire is tested against a 67.23 inch (1.72 m) diameter flywheel having a row of rounded metal knobs at six locations (every 60°) around the outer circumference. Each row of knobs are across the total width of the flywheel and are approximately 2 inches wide and 1¼ inches in height. The tire is tested at 35 mph at a load of 1,031 pounds.

"Tread" means a molded rubber component which, when bonded to a tire casing, includes that portion of the tire that comes into contact with the road when the tire is normally inflated and under normal load.

"Prefix Letters" means those identifications used and defined in *The Tire and Rim Association, Inc*, 1995 Year Book.

"Radial" and "radially" are used to mean directions radially perpendicular from the axis of rotation through the tire.

"Radial-ply tire" means a belted or circumferentially restricted pneumatic tire in which the carcass ply reinforcements which extend from bead to bead are laid at angles between 75° and 105° with respect to the equatorial plane of the tire.

"Rivet" means the open space between cords in a layer.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tensile strength" is determined by ASTM E8M-93 as applied to steel wire product.

There is disclosed a pneumatic radial tire comprising:

(a) a radial carcass having a crown region;

(b) a tread disposed radially outwardly of said crown region; and (c) at least two belt ply layers located between the tread and the crown region of the carcass, wherein each belt ply is composed of a rubber reinforcing layer having embedded therein a plurality of spaced-apart parallel steel monofilaments inclined at an angle between 10° to 30° with respect to the equatorial plane, said monofilaments being laid at a count ranging from 30 to 50 ends per inch (25.4 mm); each monofilament having a diameter of from 0.30 to 0.40 mm; a tensile strength of at least 4080 MPa−(2000×D)×95 percent, where D is the filament diameter in millimeters; and a fatigue resistance of at least 3500 cycles as measured by the three roll bending fatigue test.

Referring to FIG. 1, the present invention relates to a pneumatic tire 10. The pneumatic tire 10 has a carcass ply 12 incorporating a plurality of rubber-coated parallel cords 13. Whereas only one carcass ply 12 is shown, more than one carcass ply may be used, for example, 2, 4, 6 or 8 plies may be used.

There are a number of specific organic fiber or metallic cord constructions for use in the carcass ply 12. The cords 13 for use in the carcass ply 12 may comprise from one (monofilament) to multiple filaments. The number of total filaments in the cord may range from 1 to 13. The individual diameter of each filament generally ranges from 0.15 to 0.30 mm for each filament. Preferably, the diameter of each filament ranges from 0.17 mm to 0.22 mm. Representative examples of specific cord constructions include 1×, 2×, 3×, 4×, 5×, 6×, 7×, 8×, 11×, 12×, 1+2, 1+4, 1+5, 1+6, 1+7, 1+8, 2+1, 3+1, 5+1, 6+1, 11+1, 12+1, 2+7, 2+7+1, 3+9, 1+5+1 and 1+6+1 or 3+9+1. The most preferred cord constructions including filament diameters (in terms of millimeters) are 3×0.18, 1+5×0.18, 1+6×0.18, 2+7×0.18, 2+7×0.18×1×0.15, 3+9×0.18+1×0.15, 3+9×0.18, 3×0.20+9×0.18 and 3×0.20+ 9×0.18+1×0.15. The above cord designations are understandable to those skilled in the art. For example, designations such as 2×, 3× and 4× mean a bunch of filaments; ie, two filaments, three filaments, four filaments and the like. Designations such as 1+2 and 1+4 indicate, for example, a single filament wrapped by two or four filaments.

The above cord constructions may be composed of organic fiber or steel. Preferably, the cord construction for the carcass is steel.

The carcass ply 12 has a layer of the above-described cords 13 arranged so as to have from about 5 to about 70 ends per inch (≈2 to 28 ends per cm) when measured at the equatorial plane of the tire. Preferably, the layer of cords are arranged so as to have about 7 to about 20 ends per inch (≈2.7 to 8 ends per cm) at the equatorial plane. The above calculations for ends per inch are based upon the range of diameters for the cord, strength of the cord and the practical strength requirement for the carcass ply. For example, the high number of ends per inch would include the use of a lower diameter cord for a given strength versus a lower number of ends per inch for a higher diameter wire for the same strength. In the alternative, if one elects to use a cord of a given diameter, one may have to use more or less ends per inch depending on the strength of the cord.

The steel cord 13 of the carcass ply 12 intersect the equatorial plane (EP) of the tire at an angle in the range of from 75° to 105°. Preferably, the steel cords intersect at an angle of from 82° to 98°. The preferred range is from 89° to 91°.

A tire 10 according to the present invention has a pair of axially spaced-apart bead cores 14,16 which each comprise a plurality of wraps of a single metallic filament. The carcass ply 12 extends between the beads 14,16 and is folded thereabout. Each of the bead cores 14,16 has a radial cross-sectional shape which may be substantially pentagonal, hexagonal, rectangular or circular. In the instance where the bead has a radial cross-sectional shape which is substantially pentagonal, the greatest axial width of the bead core is located radially outwardly of the radially innermost edge of the bead core. As used herein, a "radial cross section" is a cross section taken in a plane which contains the axis of rotation of a tire or tire and rim assembly. As used herein, "substantially pentagonal" is understood to mean a five-sided cross section, even though some or all of the sides may be curvilinear rather than rectilinear, as in a regular pentagon. The radially outermost extent of the bead core being a vertex of two of the sides of the pentagon and the greatest axial width of the bead core being located radially outwardly of the radially innermost edge of the bead core.

The pneumatic tire 10 has a conventional tread 18 disposed on the crown of the carcass 12.

The pneumatic tire 10 has a belt structure comprising at least two belts 20, 22. One critical aspect of the invention is a belt structure comprising at least two plies 20,22 reinforced with parallel metallic monofilament cords 19. There are a number of metallurgical embodiments which result in the tensile strength defined above. One way of achieving such strength is by merging the proper process and alloys as disclosed in U.S. Pat. Nos. 4,960,473 and 5,066,455, which are hereby incorporated by reference in its entirety herein, with a steel rod microalloyed with one or more of the following elements: Ni, Cr, Nb, Si, Mo, Mn, Cu, Co, V and B. The preferred chemistry is listed below in weight percentages:

C 0.82 to 1.0
Mn 0.30 to 0.50
Si 0.10 to 0.30
Cr 0 to 0.4
V 0 to 0.1
Cu 0 to 0.5
Ni 0 to 0.5
Co 0 to 0.1
the balance being iron and residuals The resulting rod is then drawn to the appropriate tensile strength.

For equal filament diameters, the monofilaments used in the belt structure of the present invention have higher strength and higher fatigue life over prior art monofilaments used in belt structures. These advantages lead to pneumatic tires which have less reinforcement material and thus lower weight and cost. Further the life of the tire can be increased with the increase in fatigue resistance of the monofilament. When the belt structures incorporate monofilaments, there is a resulting reduction in gauge material and cost as compared with the use of cords containing more than one filament, making the tires lighter in weight and less costly.

The individual diameter (D) of each monofilament generally ranges from 0.25 mm to 0.40 mm having at least a tensile strength of 4080 MPa−(2000×D)×95 percent where D is the filament diameter in mm. Preferably, the tensile strength of each monofilament is at least 4400 MPa−(2000× D)×95 percent. Preferably, the diameter of each monofilament ranges from 0.30 to 0.35 mm.

Another critical property of the monofilament is that the total elongation must be at least 2 percent over a gauge length of 25 centimeters. Total elongation is measured according to ASTM A370-92. Preferably, the total elongation of the monofilament ranges from about 2 percent to 4 percent. A particularly preferred total elongation ranges from about 2.2 to about 3.0.

The torsion values for the monofilament should be at least 20 turns with a gauge length of 200 times the diameter of the wire. Generally, the torsion value ranges from about 20 to about 100 turns. Preferably, the torsion values range from about 30 to about 80 turns with a range of at least 50 turns being particularly preferred. The torsion values are determined according to ASTM Test Method E 558-83 with test lengths of 200 times the diameter of the wire.

The monofilaments for use in the belt plies 20,22 must have a fatigue resistance of at least 3500 cycles as measured by the 3 Roll Bending Fatigue Test. Preferably, the The pneumatic tires of the present invention may be designed for various load ranges. For example, the load ranges may be A, B, C, D or E. Preferably, the load range is E.

The pneumatic tires of the present invention may also be designated by various prefix letters depending on the designed service conditions requiring different loads and inflations. For example, the tires may be designated by AT, LT, P and ST. Preferably, the pneumatic tire is LT.

EXAMPLE

Three different P195/75R14 were constructed and tested for their durability. Two tires were, according to the present invention, and the other control tire used a different monofilament. The cured three tires were identical except for those items listed in Table I below.

TABLE I

|  | A | B | Control C |
|---|---|---|---|
| Belt plies | 2 | 2 | 2 |
| Gauge of top belt ply (mm) | .036 | .038 | .035 |
| Gauge of lower belt ply (mm) | .046 | .048 | .035 |
| Diameter of monofilament (mm) | .30 | .35 | .35 |
| Tensile strength of monofilament (MPa) | 3326 | 3423 | 3380 |
| Angle of monofilament of top belt (Degrees) | −21 | −21 | −21 |
| Angle of monofilament of lower belt (Degrees) | +24 | +24 | +24 |
| EPI of monofilament | 44 | 33 | 33 |
| Fatigue Resistance (Cycles) | 10,000 | 5000 | 3000 |
| Total Elongation of monofilament (%) | 2.59 | 2.42 | 1.34 |
| Torsion value | 64 | 61 | 65 |
| Gravel Wheel Test (miles) | 4100$^1$ | 3950$^2$ | 4005$^3$ |
| Wire Break in Top Belt Ply after Gravel Wheel Test | No | No | Breaks |
| Wire Break in Bottom Belt Ply after Gravel Wheel Test | No | No | Numerous Breaks |

$^1$Avg of two tires (5000 and 2900 miles)
$^2$Avg of two tires (5000 and 3200 miles)
$^3$Avg of two tires (4010 and 4000 miles)

monofilament has a fatigue resistance ranging from 3500 to 6000, with a range of at least 4000 cycles being particularly preferred.

Each belt ply, 20,22, has a layer of steel monofilaments arranged so as to have from about 25 to 60 ends per inch (25.4 cm). Preferably, the layer of steel monofilaments are arranged so as to have about 30 to 50 ends per inch (25.4 cm).

A gum rubber in a flat or wedge shape, 23, is disposed between axially outer belt edges 25,27 of the two belt ply layers 20,22.

If the tire is of the tubeless variety, a substantially air impervious layer 24 is disposed inwardly of the carcass ply 12 and contiguous to an inflation chamber defined by the volume bounded by the tire 10 and rim assembly (not shown). Most preferably a barrier layer (not shown) is disposed between the air impervious layer 24 and the carcass ply 12. The barrier ply functions to separate the air impervious layer from the elastomeric layer in which the steel monofilaments of the carcass ply 12 are embedded. Elastomeric sidewalls 26, 28 are disposed axially outwardly of the carcass structure.

The use of steel monofilaments in the belt plies as disclosed herein may be applied to general passenger radial tires as well as racing tires, agricultural tires, motor cycles, small or medium size truck tires and leisure vehicle tires. Preferably, the pneumatic tires of the present invention are directed to passenger tires and medium to light truck tires.

What is claimed is:

1. A pneumatic radial tire comprising:

(a) a radial carcass having a crown region;

(b) a tread disposed radially outwardly of said crown region; and (c) at least two belt ply layers located between the tread an the crown region of the carcass, wherein each belt ply is a rubber reinforcing layer having embedded therein a plurality of spaced-apart parallel substantially straight steel monofilaments inclined at an angle between 10° to 30° with respect to the equatorial plane of the tire, (d) a gum rubber in a flat or wedge shape disposed between the axially outer edges of said at least two belt ply layers, said monofilaments being laid at and end count ranging from 25 to 60 ends per inch (25.4 mm); each monofilament having a diameter of from 0.25 to 0.40 mm; a tensile strength of at least 4080 MPa−(2000×D)×95 percent, where D is the filament diameter in millimeters; and a fatigue resistance of at least 3500 cycles as measured by the three roll bending fatigue test.

2. The pneumatic tire of claim 1 wherein said tensile strength is at least 4400 MPa−(2000×D)×95 percent.

3. The pneumatic tire of claim 1 wherein said diameter (D) of each said monofilament ranges from 0.30 to 0.35 mm.

4. The pneumatic tire of claim 1 wherein each said monofilament has a fatigue resistance of from 3500 to 6000 cycles.

5. The pneumatic tire of claim 1 wherein each said monofilament has a fatigue resistance of at least 4000 cycles.

6. The pneumatic tire of claim 1 wherein each said monofilament has a total elongation of at least 2 percent.

7. The pneumatic tire of claim 1 wherein each said monofilament has a total elongation of from 2 percent to 4 percent.

8. The pneumatic tire of claim 1 wherein each said monofilament has a torsion value of at least 20 turns with a gauge length of 200 times the monofilament diameter.

9. The pneumatic tire of claim 1 wherein said monofilaments are laid at an end count ranging from 30 to 50 ends per inch (25.4 cm).

10. The pneumatic tire of claim 1 which is a passenger vehicle tire.

11. The pneumatic tire of claim 1 having a load range selected from the group consisting of A, B, C, D and E.

12. The pneumatic tire of claim 1 wherein each said monofilament has a fatigue resistance of from 5,000 to 10,000 cycles.

* * * * *